United States Patent [19]
Jones et al.

[11] 4,021,714
[45] May 3, 1977

[54] SERVO SYSTEM EMPLOYING A TRACKING DIGITAL ANGLE ENCODER

[75] Inventors: Donald H. Jones, Pittsburgh; Robert G. Burig, Allison Park; Paul F. McNally, Gibsonia, all of Pa.

[73] Assignee: Contraves-Goerz Corporation, Pittsburgh, Pa.

[22] Filed: Jan. 8, 1975

[21] Appl. No.: 539,265

[52] U.S. Cl. .............................. 318/594; 318/595; 318/605; 318/661
[51] Int. Cl.² ......................................... G05B 11/18
[58] Field of Search .......... 318/592, 594, 595, 596, 318/603, 604, 605, 661

[56] References Cited
UNITED STATES PATENTS

| | | | |
|---|---|---|---|
| 3,562,619 | 2/1971 | Hyoguchi | 318/603 |
| 3,686,547 | 8/1972 | Kelling | 318/594 |
| 3,826,964 | 7/1974 | Byrne | 318/602 |
| 3,922,671 | 11/1975 | Tripp | 340/347 SY |

*Primary Examiner*—Gene Z. Rubinson
*Assistant Examiner*—John J. Feldhaus
*Attorney, Agent, or Firm*—Robert D. Yeager; Howard G. Massung

[57] ABSTRACT

An absolute positioning servo for positioning a shaft in response to a digital command input which utilizes a resolver, for providing an analog position indication of the shaft, an analog to digital converter, which provides a digital indication of the shaft position, a comparator for comparing the digital command input signal with the digital indication signal and providing a differential digital error signal which is converted to an analog signal and fed back to position the shaft so that the differential digital error is 0. An analog fine control positioning means is provided which positions and maintains the shaft near the center point of the position represented by the digital command input signal when the digital differential error is 0. A signal representing the difference between the exact analog position of the shaft and the digital approximate position of the shaft is provided at the output of the translator. This is utilized to position the shaft within an angle equivalent of the least significant digital bit. The digital positioning system is utilized to move the shaft to a position within ± ½ bit of the desired position, then the analog positioning system takes over and positions and maintains the shaft within a lesser fractional portion of a bit to the absolute desired position. A short path positioning means is provided for selecting the shortest path to move the shaft to a new position indicated by the digital command input signal. That is, whenever the shaft is to be rotated to a position more than 180° away, it is rotated in the opposite direction over an angle which then is necessarily less than 180°. A square root function generator is provided following the digital to analog converter for the digital error signal which permits minimum positioning time for the servo system.

20 Claims, 7 Drawing Figures

TYPICAL VARIATION OF DEMODULATOR ERROR SIGNAL WITH POSITION

Fig. 7

SERVO SYSTEM EMPLOYING A TRACKING DIGITAL ANGLE ENCODER

CROSS REFERENCE TO RELATED APPLICATIONS

This application is closely related to U.S. patent application No. 532,066.

BACKGROUND OF THE INVENTION

1. Field of the Invention

This invention relates to an absolute positioning servo system for positioning a shaft in response to a digital command input signal and more particularly to an absolute positioning servo system utilizing a resolver instrumenting the shaft to be positioned and a tracking resolver to digital angle encoder for providing a digital representation of the shaft position.

2. Description of the Prior Art

Prior art absolute positioning servo systems utilize absolute digital encoders coupled directly to the shaft to be positioned. The conventional absolute digital encoder technique utilizes multiple gear discs in an arrangement where each disc is read by a light source and a phototransistor arrangement. Experience has shown in many industrial applications that vibration and handling of absolute digital encoders has caused substantial maintenance and down time.

Another disadvantage with absolute positioning digital encoders is that the continuous indication of the shaft position is not available. That is, the shaft digital encoder must necessarily break the shaft position down into a number of discrete intervals or steps and the position of the shaft between these steps is indeterminable. Thus over the travel or position represented by the least significant bit (LSB) of the digital count, it is impossible to ascertain or control the position of the shaft with prior art servo control the position of the shaft with prior art servo control systems. For example, in a prior art servo control system to achieve an accuracy of 0.36° the servo system must be designed so that full torque is available for a position error of 0.36° or larger. Therefore, when the system reaches its null value, that is within a range of 0.36°, which contains the desired position, the digital encoder cannot provide any feedback due to the quantization of the feedback signal over the least significant bit. The prior art systems utilizing absolute digital encoders will therefore oscillate between 0 and 1 bit of position error and cause vibration in the equipment. This can cause equipment failures or malfunction and is undesirable.

In another prior art servo control system a digital angle is fed to one input of a translator while the sine and cosine functions of the instrumenting resolver are fed to the other input of the translator and an error signal representing the difference between the digital and analog inputs is provided out of translator. The error signal can be utilized to feed a servo system which drives a motor to position the shaft so that the error signals are minimum. This type of control system, while effective for very accurately positioning a shaft, does not give an indication of the shaft position at any instant of time. That is, the shaft will move the desired position as represented by the digital input, however, it is not possible to tell where the shaft is before it has reached its steady state position. This type of absolute positioning system does not provide an indication of the present shaft position. This signal is extremely important in systems where the instantaneous shaft position is required for display or position read out to other equipment.

Whenever the term resolver is used herein, it is understood to mean, resolver, synchro, differential transformer, control transformer or any other sinusoidal position indicating device. The output of resolvers are normally in suppressed carrier form, but it is customary to discuss the output as representing the sine and cosine of selected analog angles. Whenever sine and cosine functions are discussed herein, it is to be understood that these can represent signals in absolute or suppressed carrier form.

SUMMARY OF THE INVENTION

An absolute positioning servo system for positioning a shaft in response to a digital command input signal which utilizes a resolver indicator connected to the shaft for providing an analog position indication. The analog position indicating signal is fed to a tracking digital angle encoder which provides a digital signal which indicates the position of the resolver shaft within one bit. An analog signal which represents the difference between the analog input to the tracking resolver to digital angle encoder and the digital representation output of the tracking resolver to digital angle encoder is also provided. The analog input to the digital angle encoder is designated $\theta$ and the digital output of the digital encoder is designated $\phi$. Thus the digital angle encoder provides outputs of $\phi$ in digital form and ($\theta - \phi$) in analog form. A digital command input angle $\phi'$ which represents the position to which the shaft being instrumented is to be moved is put into a storage register. Digital command input signal $\phi'$ and the digital shaft position $\phi$ are then fed to a digital subtractor which provides an output signal preferably in binary coded decimal (BCD) form representing the difference between $\phi$ and $\phi'$. This digital differential error signal ($\phi - \phi'$) is fed through a digital to analog converter and a servo control which activates a motor actuator connected to the controlled shaft so that the digital error during steady state operation is 0. This is as accurate as can be obtained with prior art servo systems utilizing shaft digital encoders. In the disclosed system when the digital differential error is equal to 0 the signal from the digital angle encoder ($\theta - \phi$) which is equal to the difference between the analog angular input $\phi$, to the encoder, and the digital command signal $\phi'$ is utilized for operating the servo controller so that the actuated motor moves the shaft to within a fraction of the least significant bit of the desired position. Thus, for a thousand count digital command input signal it is expected for example that the digital input breaks 360° of rotation into a thousand segments each having a range of 0.36°. That is, the digital command signals of a thousand points or counts actually breaks 360° of rotation into a thousand arcs wherein each arc is equal to at most 0.36°. Thus each digital command signal does not position the shaft at an exact point but only at some angle which cannot vary by more than ±0.18° from the desired point. The disclosed system utilizes an analog error signal to further position the shaft within the selected digital angle segment to a fraction of the digital angle segment. Thus with the disclosed analog positioning system a shaft can be held within say 0.036° of a desired point represented by a thousand count digital command signal. In essence the digital error signal is utilized for rapidly moving the control shaft to within one bit of the desired final position and then the analog error positioning means takes over and positions the shaft within a fraction of a bit to the desired position. This analog control feature also continues to operate to maintain the shaft within a fraction of a bit of the desired position. This eliminates oscillating between 0 and 1 bit of position error which causes vibration and equipment problems in prior art control systems. The disclosed system thus incorporates the use of high accuracy digital data for the main portion of the control range and then incorporates a proportional infinite resolution analog signal over the least significant bit of travel. This concept allows the servo system to receive proportional torque around the center portion of the least significant bit, thereby eliminating the instability normally encountered with conventional types of digital positioning equipment.

Another advantage of the disclosed system is that it provides a digital indication of the shaft position at any time. That is, the digital angle encoder provides digital signal $\phi$ which can be displayed visually, showing the exact position of the shaft at any time. This digital signal $\phi$ indicates the shaft position while it is moving to a new location as indicated by the digital command input signal $\phi'$. The digital subtractor and the digital to analog converter provides a continuous output signal corresponding to the digital differential error signal ($\phi - \phi'$). This signal is directly proportional to the instantaneous difference between the command position and the actual position of the actuator shaft. By recording or observing this signal, one can immediately determine the status of the servo control. It should be noted that in incremental or open loop systems, information of this type is not available. This signal is extremely important in high speed phase lock or continuous tracking applications where the servo must follow rapidly changing commands corresponding to instantaneous position or speed.

Another feature of the disclosed absolute positioning control system is the short path positioning for the servo system. Whenever the output of the BCD subtractor indicates an absolute position error of more than 178 its range, which for a thousand count subtractor is 500 counts, equivalent to 180°, the short path positioning logics senses this condition and inverts the analog error signal output of the digital to analog converter and the end result is that the servo system takes the shortest path to the new position indicated by the digital command input signal. This feature is especially useful for an absolute servo positioning system operating over 360°.

The disclosed servo control system also utilizes a square root function generator following the digital to analog conversion of the digital error signal which permits minimum positioning time for the servo system. This eliminates overshoot and provides a controlled slewing rate for time optimized positioning. Since the disclosed control system is an absolute positioning type, large movements can be transversed rapidly by simply commanding the end point. The motor actuator will then rotate at the selected slew rate to the new position. Unlike some incremental systems, where the computer or command device must constantly update the positioning system, in the disclosed control system only the final position is required and the servo controller automatically slews to the new point designated by the digital command input signal.

It is an object of this invention to provide an absolute positioning servo system which utilizes digital control to position a shaft within an interval, the width of which is indicated by the least significant bit of the digital counter, and to then use an analog differential signal to position the controlled shaft to within a fraction of the interval of the desired point indicated by the digital input command signal.

It is a further object of this invention to provide a servo control system which utilizes a resolver for instrumenting the controlled shaft and also selects the shortest path to the new position as indicated by the digital command input signal.

It is still a further object of this invention to teach a servo system utilizing a tracking digital angle encoder providing continuous shaft angle information which can be visually displayed.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENTS

Figure 1:
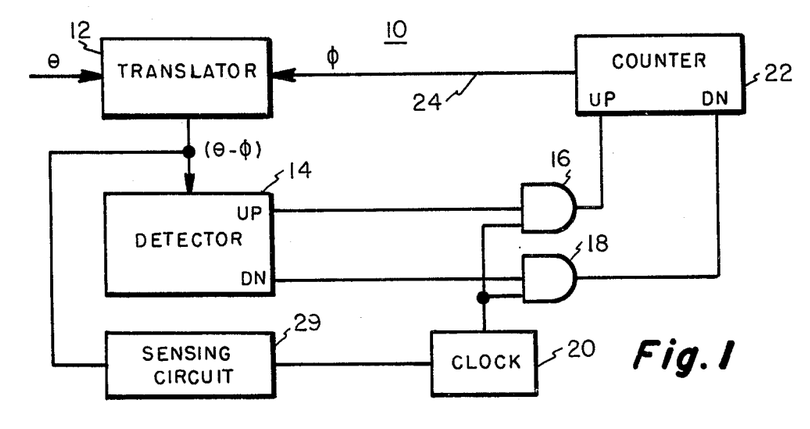
FIG. 1 is a diagram of an analog to digital angle encoder utilizing the teaching of the present invention.
Figure 2:
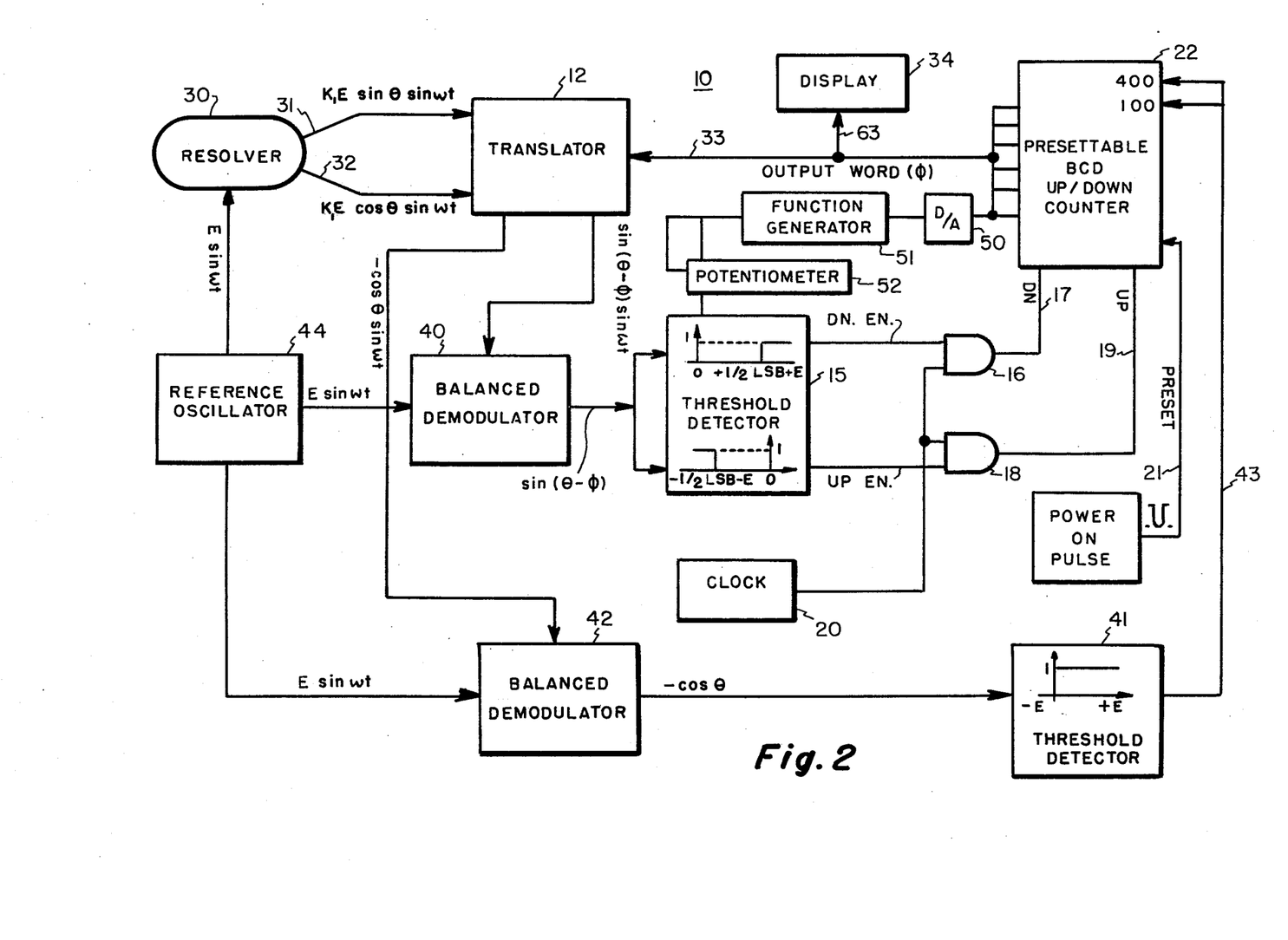
FIG. 2 is a block diagram of a tracking digital angle encoder utilizing the teaching of the present invention.

Referring now to the drawings and FIGS. 1 and 2 in particular, there is shown a digital angle encoder 10 utilizing the teaching of the present invention. As is shown in FIG. 1 an analog signal $\theta$, which represents a position, is fed to one input of a translator 12, while a digital signal $\phi$ is fed to another input of translator 12. Translator 12 provides an output ($\theta - \phi$) which is equivalent to the difference between its inputs. This difference ($\theta - \phi$) is fed to a detector 14 which determines if the ($\theta - \phi$) error signal is positive or negative and activates appropriate AND gate 16 or 18 so that a clock 20 can activate counter 22 to reduce the error signal ($\theta - \phi$) to within a predetermined value. That is, counter 22 counts so that ($\theta - \phi$) at steady state it is within one count of the least significant bit to $\phi$. For example, for a 1000 count counter, each count is equal to 0.36° and the digital output $\phi$ of counter 22 will be within 0.36° of the analog input $\theta$. That is, if every indication $\phi$ of counter 22 is viewed as representing an absolute point, then the analog input $\theta$ is within plus or minus ½ of the least significant bit to that point. For a one thousand count counter then, the analog signal $\theta$ is within 0.18° of an absolute point, which is realty, is the midpoint of the range defined by the counter indication $\phi$. Detector 14 is constructed so that whenever ($\theta - \phi$) is greater than plus 0.18° by a small amount, the detector 14 will activate AND gate 16 to enable up/down counter 22 to count up, increasing $\phi$, in response to pulses from clock 20. Similarly whenever $(\theta - \phi)$ is less than −0.18° by a small amount, the lower threshold AND gate 18 will be activated enabling the counter 22 to count down, decreasing $\phi$, in response to pulses from clock 20. However, when the absolute value of $(\theta - \phi)$ is less than 0.18° both the up and down gates 16 and 18, respectively, are disabled and clock pulses are not fed to the counter. Whenever the error signal is positive, the counter counts up. Similarly whenever the error signal is negative, the counter counts down. The output of the counter, which is normally in binary coded decimal form (BCD), is fed back to the translator 12 along line 24. In essence, this is a closed loop feedback control system. The disclosed system is an electronic servo, wherein the digital output of counter 22 follows the analog input to translator 12. The tendency of the system is to reach a steady state with minimum error signal. If the analog input angle $\theta$ is arbitrarily changed to a new position, detector 14 instantly will enable the proper AND gate 16 or 18 to clock the counter in the right direction until the error signal $(\theta - \phi)$ drops to within the range plus or minus ½ of the last significant bit (LSB) and the counter output 22 will settle to a new steady state value equal to the best BCD equivalent of the new analog indication.

The disclosed analog to digital angle encoder 10 preferably utilizes a solid state translator as described in more detail in copending U.S. patent application Ser. No. 529,701. Translator 12 can best be described as a hybrid computer which performs the computation of the function sin $(\theta - \phi)$; where $\theta$ is the angular position of a resolver 30 and $\phi$ is the angle of the counter 22.

Referring now to FIG. 2, there is shown a tracking digital angle encoder 10 utilizing the teaching of the present invention. Translation 12 is fed an analog signal $\theta$ which is in suppressed carrier sine, cosine form. A resolver 30 provides a signal $K_1 E \sin \theta \sin \omega t$ on line 31 and the signal $K_1 E \cos \theta \sin \omega t$ on line 32 which are fed to translator 12. Sin $\omega t$ is a carrier the magnitude of whose envelope provides the desired information. Another input, in digital or in binary coded decimal (BCD) form, is provided to the translator 12 from counter 22 along line 33. If desired, an optical display 34 of the output of digital counter 22 can be provided. The output 34 is controlled by the position of the shaft of resolver 30 as will be hereinafter described in detail. The output of display 34 is the digital equivalent of the analog input to translator 12. Thus the output of the display 34 provides a visual indication of the position of the resolver shaft 30. Translator 12 provides an output equal to sin $(\theta - \phi) \sin \omega t$. The analog function sin $(\theta - \phi) \sin \omega t$ is generated by performing certain trigonometric manipulations on the resolver output signals sin $\theta \sin \omega t$ and cos $\theta \sin \omega t$ and is based on the following identity:

$$\sin (\theta - \phi) = (\sin \theta - \cos \theta \tan \phi) \cdot \cos \phi.$$

The programmed angle $\phi$ is usually available as a 12-bit BCD (3 decade) word. With the addition of a few other building blocks, a continuous tracking resolver to digital angle encoder can be constructed. For a thousand count counter, the digital angle encoder will have a range of 0 to 999 plus or minus ½ LSB (0° − 359.64 plus or minus 0.18°). The output of the translator 12 is an amplitude modulated sine wave proportional to sin $(\theta - \phi) \sin \omega t$. This output signal is fed to a balanced demodulator whose excitation is the same as the carrier E sin $\omega t$. The output of the demodulator is proportional to sin $(\theta - \phi)$, with the carrier removed. This represents the differential error between the resolver angular position $\theta$ and the digital position $\phi$ from counter 22. When $\theta$ is approximately equal to $\phi$, then sin $(\theta - \phi)$ is approximately equal to $(\theta - \phi)$. Demodulated error signal sin $(\theta - \phi)$ is fed to a double ended threshold detector 15 whose upper and lower threshold limits are set at essentially DC levels of + ½ LSB and − ½ LSB, respectively. Expressed in degrees, the threshold levels are equivalent to 0.18° and −0.18°, for a one thousand count counter. Whenever $(\theta - \phi)$ is greater than +0.18° the upper threshold detector will switch and enable preset BCD up/down counter 22 to count up. Similarly, whenever $(\theta - \phi)$ is less than −0.18°, the lower threshold detector will enable the counter 22 to count down. However, when absolute value $(\theta - \phi)$ is less than 0.18°, both the up and down counter lines 17 and 19, respectively, are disabled and the clock pulses are inhibited to the counter 22. The phasing of the demodulator is such that whenever the error signal is positive the counter counts up. Similarly when the error signal is negative, it counts down. Counter output word $\phi$ is coupled back to translator 12. The tendency of the system is to reach a steady state with minimum error signal. In the disclosed system the counter output reaches a steady state when the demodulated error signal drops down to a value within plus or minus ½ LSB. In the steady state the counter output word $\phi$ will be the BCD number corresponding to $\theta$ within plus or minus ½ LSB.

If the resolver 30 shaft is arbitrarily rotated to a new position, the threshold detector 14 instantaneously will enable the clock pulses to clock the counter 22 in the proper direction, until the error signal drops to within plus or minus ½ LSB and the counter 22 output will settle to a new steady state value equal to the BCD equivalent of the new resolver 30 angular position. From the above explanation, it can be easily seen that when the resolver 30 is rotated to a new position, the digital output of the counter 22 will follow; thus the tracking nature of the system is obvious.

To keep the settling time, that is the time for the counter 22 output digital word to settle to a new value after a change in the resolver 30 shaft position, small, a high clock frequency is used. The period of the clock cycle, however, should be sufficiently greater than the turn on time for the solid state analog switches utilizes in the system. For the tracking digital angle encoder shown in FIG. 2 a clock frequency of 100 KHz is used. The frequency of clock 20 can vary as the new settling position is approached. The variation can be continuous or in discrete steps. The output of translator 12 $(\theta - \phi)$ can be sensed, and as this changed the frequency of clock 20 can be varied. When the error signal $(\theta - \phi)$ is within a predetermined separation, equivalent to say 3 counts of counter 22, the frequency of clock 20 can be switched to a new frequency such as 10 KHz. This permits rapid settling of the encoder 10 with no overshoot or stability problems. A sensing circuit 29 is provided connected between the output of translator 12 and clock 20 to adjust clock 20 frequency as the error signal $(\theta - \phi)$ changes. A step change or a continuous change of frequency can be used.

Most of the prior art tracking type digital angle encoders cannot differentiate between any two positions of the resolver shaft which are 180° apart, whenever power is turned on. To overcome this difficulty, the disclosed system utilizes the cos $\theta$ sin $\omega t$ output of the translator 12. The resolver output corresponding to minus cos $\theta$ sin $\omega t$ is demodulated in a second demodulator 42 which provides an output proportional to minus cos $\theta$. Since cos $\theta$ is negative for $\theta$ in the second and third quadrants, that is between 90° and 270°, this can be utilized at turn on to preset the counter 22 to a preselected midpoint value, such as 500 for a 1000 count counter. Thus, whenever the resolver shaft is setting at an angle between 90° and 270°, the counter is set at 500 when power is first applied and for a resolver shaft at an angle of 270° to +90°, the counter is preset at 000. A power on pulse along line 21 sets counter 22 to 000 when power is applied and cos $\theta$ is positive; and when power is applied and cos $\theta$ is negative, a pulse through detector 41 along line 43 sets counter 22 to 500. After the counter is initially preset, the tracking action of the system 10 takes over and the counter output settles to the digital value indicating the position of the resolver shaft 30 within plus or minus ¼ LSB. Reference oscillator 44 provides the carrier frequency signal E sin $\omega t$ to resolver 30 and also to demodulators 40 and 42.

For a thousand count counter each count corresponds to a selected 0.36° range; that is, the threshold detector in this case is set so that the output of balanced demodulator 40 can vary over a range of 0.36° without causing the counter to count one pulse. A digital to analog converter 50 and a potentiometer 52 feedback loop are provided from the counter 22 to the threshold detector 15 for varying the level at which the threshold detector 15 enables gate 16 or 18 to activate the counter 22. That is, potentiometer 52 provides for adjustment of the threshold level of detector 15. This adjustment permits the angular equivalent value of each count of counter 22 to be varied. For instance, with the variable feedback loop through D/A converter 50 and potentiometer 52, counter 22 can be adjusted so that more or less pulses indicate full revolution of the shaft of resolver 30. For example, this adjustment permits a 950 count to represent full rotation of the shaft of the resolver 30. Or alternatively, 1050 counts could represent full revolution of resolver 30 shaft. This effectively changes the value for one count of the counter 22. If the circuit is adjusted so that say a full revolution of resolver 30 shaft is indicated by 990 counts, each count of the counter is equivalent to being increased by slightly greater than 1% over those for a normal thousand bit count and are equal to 0.3636+°. This adjustment allows for correction of mechanical errors or mechanical differences in activating resolvers 30. The adjustment loop comprising D/A converter 50 and potentiometer 52 allows the revolution of the system to be precisely set over a predetermined range of full scale. This position correction allows errors due to mechanical tolerances or mechanical wear to be easily corrected. With the proper input signal, the feedback adjustment can also be used to correct for nonlinear position variations. A function generator 51 can be used in the controlling connection to detector 15 to vary or impose a signal on the levels of detector 15.

Figure 7:
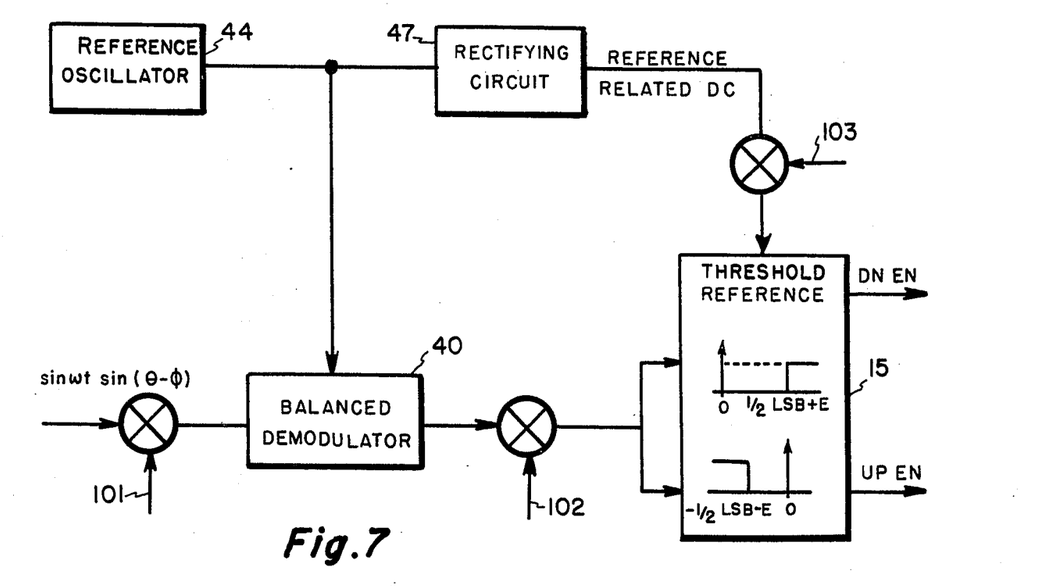
FIG. 7 is a preferred embodiment of a portion of the encoder circuit shown in FIG. 2.

FIG. 7 illustrates a portion of the encoder circuit 10 shown in FIG. 2, including a DC reference supplied to the threshold detector 15 by a rectifying circuit 47 from the reference oscillator 44. In a tracking digital angle encoder as shown in FIG. 2, the amplitude of the signal, sin ($\theta - \phi$), fed to the threshold detector 15 is determind by: (a) reference oscillator 44 amplitude; (b) resolver 30 transmission ratio; (c) translator 12 transmission ratio; and (d) the gain of balanced demodulator 40. The final amplitude of sin ($\theta - \phi$), which is dependent on the above listed factors, determines the level at which threshold detector 15 levels must be set. Without supplying the threshold detector 15 with a DC reference which is related to the amplitude of the reference oscillator 44, it would be necessary to have a reference oscillator with very stable amplitude for proper operation. Otherwise it would be necessary to adjust the detector 15 or oscillator 44 for every variation in the amplitude of oscillator 44. A translator 12 without compensation for oscillator 44 amplitude variation would be subject to variations due to aging and environmental conditions and might require frequent readjustments. A highly stable reference oscillator 44 would also be required. In the circuit shown in FIG. 7 the threshold detector levels are derived from the oscillator reference 44 by a rectifying circuit 47, which establishes the fundamental threshold levels as a function of the amplitude of the output of reference oscillator 44. Therefore, when the amplitude of the reference oscillator 44 changes, the fundamental threshold detector 15 levels are automatically changed to the proper levels.

FIG. 7 also shows three possible input lines 101, 102 and 103 which can be used for varying operation of threshold detector 15. A signal can be applied to the fundamental threshold detector levels via line 103. The signal applied on line 103 could be a signal related to the reference oscillator 44 in such a manner as to alter the absolute value of the fundamental threshold levels in synchronism with the reference oscillator so as to reject unwanted or quadrature signals and thereby enhance the performance of encoder 10.

Lines 101 and 102 can be used for adjusting encoder 10 by adding an AC carrier modulated signal to the term sin $\omega t$ sin ($\theta - \phi$), along line 101, before the balanced demodulator 40 or a DC signal to the term sin ($\theta - \phi$), along line 102, after the balanced demodulator 40. Signals added at these lines 101, 102 and 103 could be externally supplied or derived from the counter output through a D/A converter 50 and function generator 51. The signals supplied can compensate for linear or nonlinear errors or cause the encoder 10 to generate linear or non-linear position functions. FIG. 7 thus shows means by which the encoder 10 can be adjusted or its performance enhanced by either adjusting the threshold detector or adding signals to the primary function sin ($\theta - \phi$). Also shown are means by which the encoder 10 is made insensitive to variations in the amplitude of the reference oscillator 44, to quadrature signals, or other unwanted signals.

Figure 6:
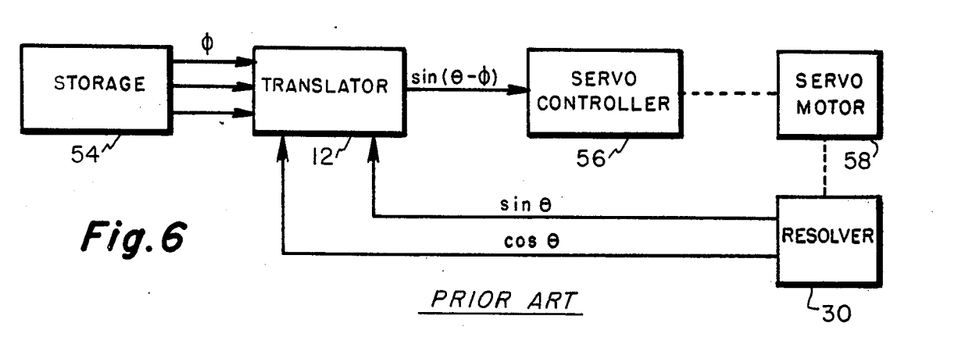
FIG. 6 is a block diagram of a prior art servo positioning system.

Referring now to FIG. 6, there is shown a prior art servo system. A digital command signal $\phi$ is fed from the digital storage unit 54 to translator 12. Translator 12 is supplied with input signals in sine and cosine form indicating the position $\theta$ of a resolver 30. The output of the translator 12 is the difference between the analog input $\theta$ and digital input $\phi$ and is equal to sin ($\theta - \phi$). This is fed to a servo controller 56 which activates a servo motor 58 to move a shaft (not shown) to which resolver 50 is connected, so that the error signal output of translator 12 sin ($\theta - \phi$) is a minimum. The problem with this construction is that there is no indication of the shaft location when digital input angle $\phi$ is changed.

Figure 3:
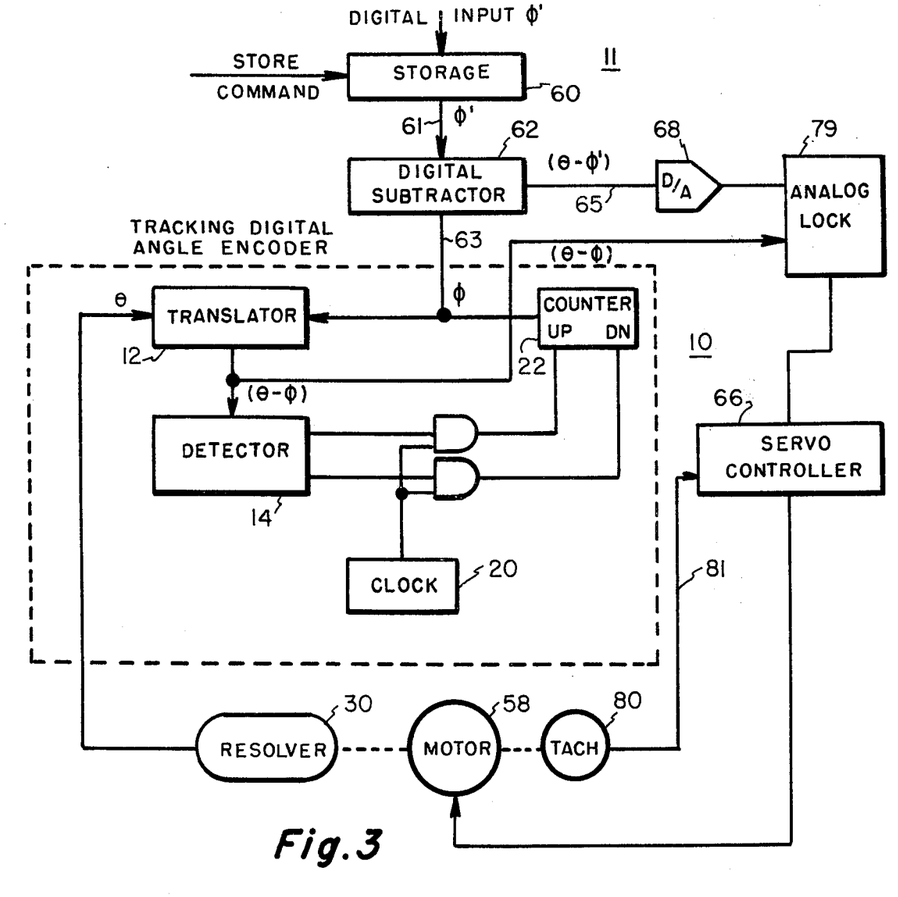
FIG. 3 is a block diagram of an absolute positioning servo system utilizing the digital angle encoder shown in FIG. 1.
Figure 4:
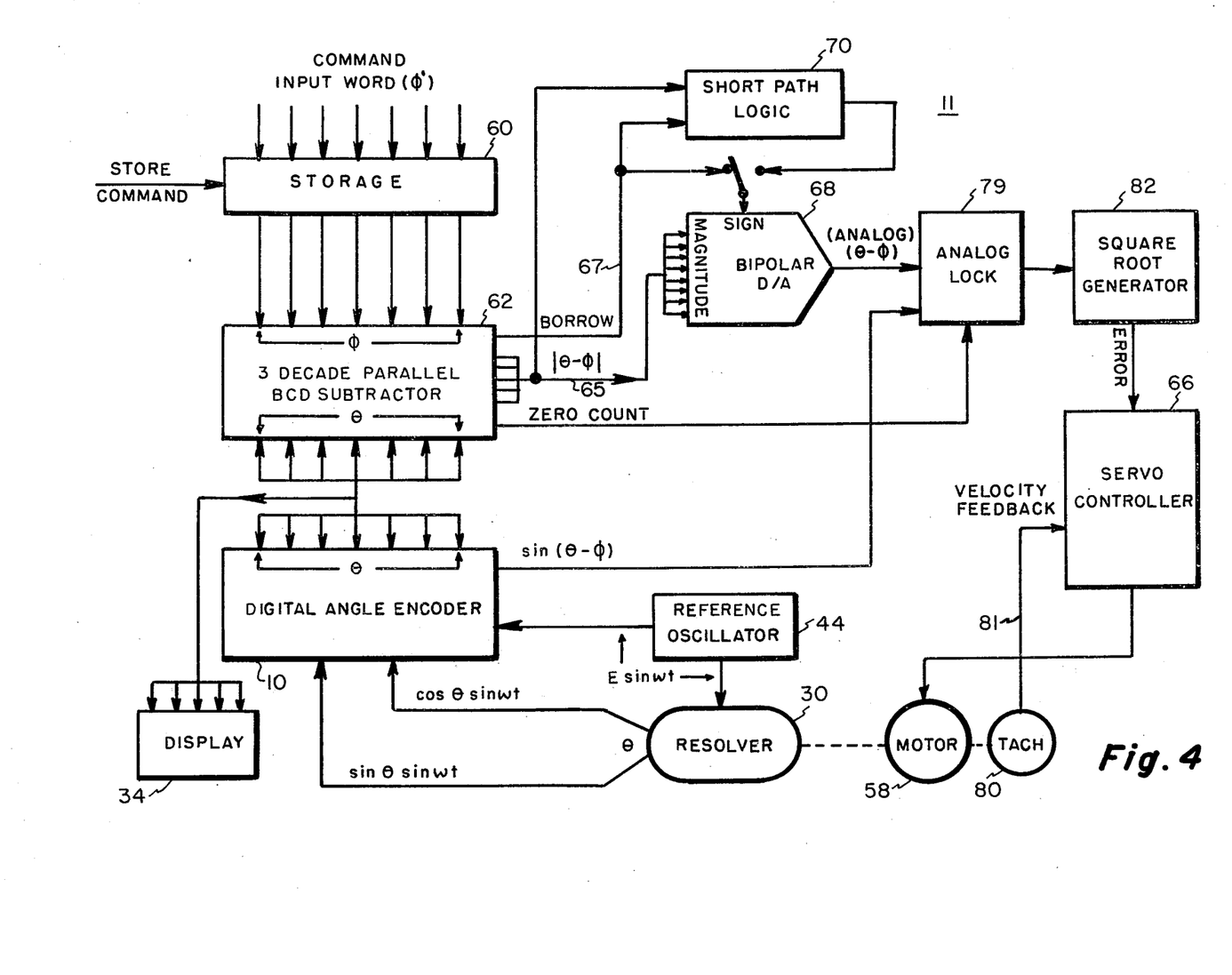
FIG. 4 is a diagram of an absolute positioning servo system utilizing the digital angle encoder illustrated in FIG. 2.

Referring now to FIGS. 3 and 4, there is shown an absolute positioning servo system built in accordance with the teaching of the present invention. This system incorporates the use of either a single speed or a two speed resolver feedback element, combined with a solid state digital translator, as described more fully in U.S. patent application Ser. No. 529,701. The translator 12 is connected as a digital encoder, as described previously, that provides BCD output over a predetermined range. The use of an absolute position resolver 30 for the feedback arrangement is substantially superior to that of a digital encoder, due to the inherent reliability associated with resolvers. The resolver 30 utilized requires no alignment, and incorporates no contact elements to wear or cause maintenance problems. The preferred resolver 30 incorporates a brushless rotary transformer, thus eliminating slip rings or brushes. In contrast to a conventional absolute digital encoder system which uses multiple gear discs in an arrangement where each disc is read by a light souce diode and a photodetector arrangement, the inherent superior reliability of the disclosed resolver position control system is apparent. Experience has shown in many industrial applications that vibration and handling of conventional encoders has caused substantial maintenance and down time.

Servo control system 11, shown in FIGS. 3 and 4, utilizes the tracking digital angle encoder 10, as shown in FIGS. 1 and 2, to provide an absolute positioning servo system. To build an absolute positioning servo system it is necessary that the position transducer transmits positional information correctly even when power is temporarily interrupted and later restored. The disclosed tracking digital angle encoder 10 qualifies as an absolute digital position transmitter, since it will accurately provide a digital indication of the resolver shaft position even after temporary power interruption. A temporary digital storage register 60 is provided for storing the digital input command signal $\phi'$. The temporary digital storage register 60 stores and provides digital output signals along line 61 which are equal to the digital command inut signal $\phi'$. As explained previously, the tracking digital angle encoder 10 provides a digital output signal $\phi$, in BCD form, which represents the position of the shaft of resolver 30. $\phi$, which is the output of counter 22, is transmitted along line 63 to a digital display output 34, shown in FIG. 2, and to a digital subtractor 62. Digital subtractor 62 is provided for sensing a differential error $(\theta - \phi')$ between the actual shaft position $\phi$ and the command shaft position $\phi'$. The parallel BCD subtractor 62, of appropriate length, is used as a calculator of the digital difference error $(\phi - \phi')$ after receiving the $\phi'$ signal along line 61 and the $\phi$ signal along line 63. Digital subtractor 62 provides the differential error signal $(\phi - \phi')$ along line 65. Since the servo system can be operated by an analog voltage input the differential error signal $(\phi - \phi')$ is transformed into an analog voltage form before being fed to the servo controller 66. The conversion of the digital error signal $(\phi - \phi')$ to an analog error signal is accomplished by a digital to analog converter 68. This provides an analog signal that is fed to servo controller 66, which in turn activates motor 58 to move the shaft which resolver 30 is instrumenting to a position wherein $\phi = \phi'$. That is, the feedback control system of the absolute positioning servo system 11 is set up so that resolver 30 shaft is moved to position wherein the digital differential error signal $(\phi - \phi') = 0$. The bipolar D/A converter, shown in FIG. 4, actually comprises a unipolar D/A converter followed by a buffer amplifier which is switched from a noninverting to an inverting mode by the borrow output of subtractor 62 along line 67. Digital subtractor 62 performs the fundamental servo function of comparing the command position $\phi'$ to the feedback position $\phi$, and produces a corresponding error signal. Since the tracking digital angle encoder digitizes the resolver feedback in order to provide absolute digital position readout capability, position translator 12 is used to compare the analog feedback from the resolver with the digital signal from the counter 22. Whenever one bit difference is detected at the translator 12 output, another count is accumulated into position counter 22. The position error detector, which is digital subtractor 62 and D/A converter 68, provides an output corresponding to the servo error signal. This signal which is available to be monitored is directly proportional to the difference between the command position $\phi'$ and the actual position $\phi$ of the resolver 30 shaft within a resolution of one bit. By observing this signal the status of the servo control can immediately be determined. This signal is extremely important in high speed phase lock or continuous path applications where the servo must follow rapidly changing commands, corresponding to instantaneous position or speed commands.

In addition to the inherent reliability gained by the use of resolver feedback signals, the absolute positioning servo systems 11 can also provide an infinite resolution feature, which is not obtainable in standard absolute digital type encoder positioning systems. This analog servo lock feature digital is achieved by switching the demodulated analog error signal $(\theta - \phi)$ from the digital encoder 10 to the servo controller 66 when the BCD subtractor 62 indicates 0 digital differential error. This feature can best be understood with reference to FIGS. 4 and 5. The disclosed invention allows the digital positioning system to incorporate the use of high accuracy digital data for the main portion of the range and then to incorporate a proportional infinite resolution analog signal over the least significant bit of travel. The demodulated error signal $(\theta - \phi)$ shown in FIG. 5 resembles a saw tooth profile 71 with the serations occurring with change in position rather than time. The width of each seration, of wave 71, is 1 LSB. Since the error signal $(\theta - \phi)$ is continuous within each seration the analog lock feature permits the disclosed servo positioning system 11 to lock onto its analog position signal within each least significant bit and achieve position accuracies of better than 1/5 LSB. This analog lock feature also allows the servo system to receive proportional torque around the center portion of the LSB, represented in FIG. 5 at 0°, thereby limiting the instability normally encountered with the conventional type of digital positioning equipment.

Figure 5:
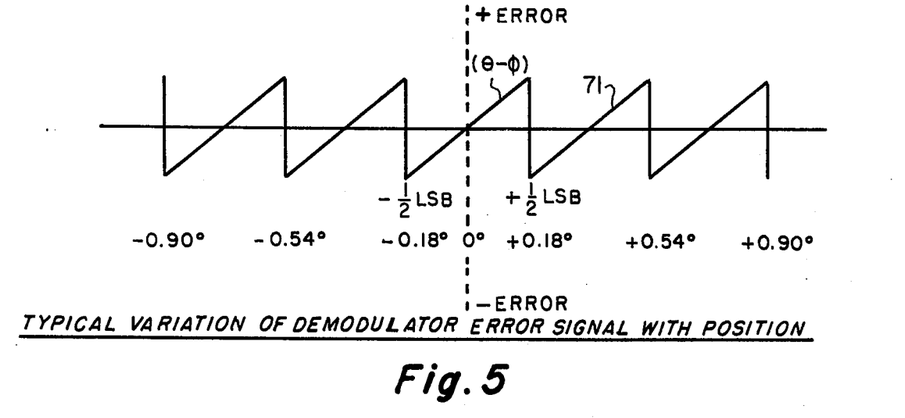
FIG. 5 is a graph showing the variation of the modulated error signal with respect to position.

The inherent advantages of the infinite resolution proportional feedback is best understood by considering a system having an error signal as shown in FIG. 5 with a resolution of 0.36° per bit. In order to achieve the accuracy of 0.36°, the prior art digital servo system must be designated such that full torque is available for position error of 0.36° or larger. Therefore, when the prior art positioning system reaches its null value the digital encoder cannot provide any feedback due to the quantization of the feedback signal over the LSB. That is, prior art positioning systems which use digital encoders coupled to the shaft to be controlled necessarily break the position of the shaft down into discrete intervals. Information about the position of the shaft within any discrete interval is not available in the prior art systems. The prior art system therefore will oscillate between 0 and 1 bit of position error and cause vibration of the equipment. This hunting and seeking can be eliminated with the control system as shown in FIGS. 3 and 4 which switches to an analog positioning system over the least significant bit of error. A proportional signal is generated over the least significant bit of travel allowing the servo system to lock precisely in the center of the least significant bit. The disclosed system 11 provides proportional torque as a function of position error to maintain the desired position. With this technique, positioning accuracies and resolutions of a fraction of the least significant bit can be obtained.

Another feature shown on the servo control system 11 of FIG. 4 is the short path positioning for the servo system 11. Whenever the BCD subtractor 62 indicates an absolute position error of more than 500, the short path position logic 70 senses this condition and inverts the analog error signal to the servo controller 66 resulting in the servo system 11 taking the shortest path for positioning. This feature is especially useful for an absolute servo positioning over 0° to 360°. Tachometer 80 is connected to the motor 58 for providing a feedback signal along line 81 to servo controller 66. This velocity feedback signal from tachometer 80 helps assure that servo controller 66 rapidly drives motor 58 in a controlled fashion to the desired position.

Exceptionally high band width is available in the tachometer feedback loop. This is accomplished since the motor 58 and tachometer 80 assembly is a single housed unit with the armature of the tachometer 80 and the motor 58 being physically as close as possible to each other. This close coupling eliminates any torsional resonance which would be introduced by coupling between the motor 58 armature and the tachometer 80 armature. In addition, the motor 58 is chosen to have extremely low armature inductance which further extends the usable servo band width. The servo controller 66 with the feedback from tachometer 80 utilizes nonlinear processing electronics to eliminate overshoot and to provide a controlled slewing rate for time optimized positioning. Since the disclosed servo system 11 is an absolute system, large movement can be transversed very rapidly by simply commanding the end point. The motor 58 will then rotate at the selected slewing rate to the new position. Unlike some incremental systems, where the computer or command device must constantly update position information, the disclosed servo system 11 requires only the final position and it automatically moves to the new point. Square root generator 82, which feeds the error signal to servo controller 66, permits minimum positioning time for the servo system. The square root generator 82 and the servo controller 66 provide control during positioning of motor 58. This circuit operates by computing the maximum speed from the error signal and deceleration available. From this computation a signal is developed that is proportional to the precise speed of the motor shaft that will provide optimum positioning time without overshoot. This is accomplished by utilizing the output of the tachometer 80 which provides a signal proportional to speed as a control variable. As the new position is reached, square root generator 82 and servo controller 66 provide automatic controlled deceleration so as to reach the position with no overshoot. Adjustments can be made to achieve the maximum slewing velocity and deceleration consistent with the mass and inertia of the driven member.

The servo controller 66 comprises a high performance bipolar regenerative transistorized power amplifier and a preamplifier for providing the linear compensation and nonlinear stabilization networks. The low level DC input from the square root generator 82 to servo controller 66 is initially amplified by the preamplifier which also includes servo compensation circuitry. The output of the preamplifier is applied to a power amplifier which provides power and current amplification in order to drive the DC servo motor 58. The standard servo controller utilized in the disclosed servo system 11 provides a proportional output up to plus or minus 150 volts and plus or minus 35 amps depending on the controller required for the given applications. Regenerative control of the motor is provided within the power amplifier portion of servo controller 66. During deceleration the amplifier actually draws power from the motor 58 to provide for a rapid stop. Since the power amplifier utilized in servo controller 66 is an all transistor type the output power is smooth and free from pulsations normally found in SCR type amplifiers. In addition the smooth proportional power provided by the transistor amplifier reduces motor heating produced by corresponding SCR type amplifiers.

The motor actuator which comprises motor 58 and tachometer 80, employed in the controlled system 11, consists of a permanent magnet, high response servo motor 58 with the resolver 30 feedback assembly as an integral portion of the motor actuator. The tachometer 80 is usually included in the motor assembly. By virtue of the direct drive servo actuator approach, no power gear train is required. The disclosed system achieves a high level dynamic performance which is an order of magnitude better than the highest performance of a stepper motor or conventional closed loop servo system. Unlike stepper motor systems, the servo motors can operate with low or high inertia load without the risk of losing pulse or position reference.

It can thus be seen that the servo system 11 disclosed, provides for an absolute positioning system in response to the digital command input $\phi'$. The resolver 30 which is connected to the shaft feeds a signal $\theta$ to the tracking resolver to digital angle encoder 10, which provides a digital output signal $\phi$ indicating the position of the shaft within an accuracy of one bit. The digital position of the shaft $\phi$ is then compared with the digital command input position $\phi'$ and an error signal equaling the digital difference is provided by subtractor 62. This digital difference then goes through a digital to analog converter 68 and various other devices to be applied by servo controller 66 to control motor 58 which then rotates the shaft, to which is connected the shaft of resolver 30, to a position wherein the digital command signal $\phi'$ is equal to the digital position indicator $\phi$ from counter 22. At this point motor 58 has positioned resolver 30 within $\pm \frac{1}{2}$ LSB of the desired absolute position. At this point when $\phi = \phi'$, coarse positioning which is provided by the difference between $\phi$ and $\phi'$, is deactivated, and the fine positioning controlled by the difference between the exact position analog input $\theta$ and the digital input $\phi$, which at this point is equal to $\phi'$, is utilized for exact positioning of resolver 30 within a fraction of ½ LSB. The difference between the analog feedback signal $\theta$ and the digital command input signal $\phi'$ is fed to analog lock 79 which feeds a signal to servo controller 66. The analog lock 79 then utilizes the continuous input of the error signal $(\theta - \phi)$ and activates servo controller 66 to move motor 58 to an exact position and hold this position, which is a fraction of the ½ LSB. Thus it can be seen that the servo controller 66 utilizing the teaching of this invention can position the shaft at discrete positions which are repeatable and which can be held much closer then those obtainable with a normal digital shaft encoder.

What is claimed is:

1. An absolute positioning servo for positioning a movable member in response to a digital command input signal comprising:
   - analog position indicating means connected to the movable member, providing an analog output signal indicating the absolute position of the movable member;
   - analog to digital converter means connected to said analog position indicating means providing a digital output, of the same forth as the digital command input signal, corresponding to the position of the movable member;
   - coarse feedback control means connected to receive the output of said analog to digital converter and the digital command input signal for positioning the movable member so that the digital output of the analog to digital converter means is equal to the digital command input signal; and
   - fine feedback control means connected to compare the output of said analog position indicating means and the output of said analog to digital converter means for maintaining the position of the movable member within a distance, which is a fraction of the distance represented by one digital count of the digital command input signal, of the center point of the position indicated by the digital command input signal.

2. An absolute positioning servo system as claimed in claim 1 comprising:
   - short path means for selecting shortest path for moving the movable member to a new position indicated by the digital command input signal.

3. An absolute positioning servo as claimed in claim 2 wherein:
   - the movable member comprises a rotatable shaft; and
   - said short path means changes the direction of rotation of said shaft whenever the difference between the digital command input signal and the output of the analog to digital converter means is greater than 180°.

4. An absolute positioning servo system as claimed in claim 3 comprising:
   - a visual readout connected to said analog to digital converting means providing a visual indication of the position of the movable member.

5. An absolute positioning servo system as claimed in claim 1 wherein said analog to digital converter means comprises:
   - counter means responsive to an input providing a digital output corresponding to a position;
   - translator means connected to the outputs of said analog position indicating means and said counter means for providing an analog signal in trigonometric form proportional to the difference between the output of said analog position indicating means and said counter means; and
   - feedback means responsive to the analog difference signal of said translator connected to feed the input of said counter means from the output of said translator means to keep the output of said counter means equivalent to within a predetermined position of the position indicated by said analog position indicating means.

6. An absolute positioning servo system as claimed in claim 5 wherein:
   - each count of said counter means corresponds to a known position; and
   - adjusting means connected to said counter means for adjusting the known position to which each count of said counter means corresponds.

7. An absolute positioning servo system as claimed in claim 5 wherein:
   - each count of said counter means corresponds to a known position displacement; and
   - vari trim means connected between said translator and said counter for adjusting the position displacement to which each count of said counter means corresponds.

8. A servo positioning system for moving a shaft to a desired angular position in response to a digital command input signal comprising:
   - a resolver connected to the shaft providing an output signal in trigonometric form indicating the position of the shaft;
   - analog to digital converter means, connected to said resolver output, providing a digital response signal which is dependent on the output signal of said resolver;
   - comparator means connected to receive the digital command input and the digital response signal for providing a digital error signal equal to the difference;
   - primary control means connected between said comparator means and the shaft to move the shaft to a position where the error signal of said comparator means approaches zero;
   - said analog to digital converter means providing a trigonometric representation of the difference between the trigonometric output of said resolver and the digital response signal; and
   - analog lock means, activated when the digital error signal is within a predetermined distance from zero, connected between said analog to digital converter means and the shaft to maintain the shaft near the desired position so that the trigonometric representation of the difference between the trigonometric output of said resolver and the digital response signal is maintained below a predetermined small value.

9. A servo positioning system as claimed in claim 8 wherein said analog lock means maintains the shaft within an angular displacement of the desired position which is less than the angular displacement represented by one bit of the digital command input.

10. A servo positioning system as claimed in claim 8 including:
    - short path positioning means connected between the shaft and said comparator means for always selecting the direction of rotation so that the shaft can be rotated to a new position which is less than 180° away.

11. A servo positioning system as claimed in claim 8 comprising:

visual readout means connected to said analog to digital converter means for providing a visual indication of the position of the shaft.

12. A servo positioning system as claimed in claim 8 wherein:
each count of the digital response signal provided by said analog to digital converter means corresponds to a determinable angular displacement; and
adjusting means connected to said analog to digital converter for adjusting the angular displacement to which each count of the digital response signal corresponds.

13. A positioning servo for positioning a shaft in response to a digital command input signal comprising:
resolver means connected to the shaft giving an analog signal indicating the position of the shaft;
a digital counter providing a digital output signal determined by an input signal;
translator means receiving the analog signal from said resolver and the digital signal from said counter and providing an analog difference signal which represents the difference between the analog signal from said resolver and the digital output signal from said digital counter;
detector feedback means connected between said counter and said translator and utilizing the analog difference signal to keep said counter within one bit of the angular position represented by said analog signal;
subtractor means connected to receive the digital command input signal and the digital output signal from said counter and providing a digital difference; and
positioning means connected between said subtractor means and the shaft to rotate the shaft to a position where the digital difference is zero.

14. A positioning servo as claimed in claim 13 comprising:
adjusting means connected to vary the input signal of said digital counter.

15. A positioning servo as claimed in claim 13 comprising:
a visual readout connected to said counter for providing a visual indication of the output signal of said counter.

16. A positioning servo as claimed in claim 13 comprising:
analog lock means connected to be activated when the digital difference is zero; and
analog control means operated by said analog lock means to maintain the shaft within a predetermined rotational angle of the position represented by the digital input signal which is less than the rotation represented by one bit of the digital input signal.

17. A positioning servo as claimed in claim 16 including:
short path rotation means connected to said digital subtractor and said positioning means for selecting the direction of smallest rotation to a new shaft position indicated by the digital command input signal.

18. A servo positioning system for positioning an item in response to an absolute digital input command comprising:
a servo motor for positioning the item;
a servo motor controller for controlling operation of said servo motor in response to an analog input signal;
a resolver for providing an analog indication of the position of an item to be positioned;
a digital angle encoder connected to said resolver providing both a digital representation of the item position, and an analog difference signal of the difference between the resolver analog indication of the item position and the digital representation of the item position;
a digital to analog converter connected to said servo motor controller for supplying an analog control signal thereto in response to a digital input;
digital control means for supplying a digital input signal to said digital to analog converter for moving the item to be positioned to a desired position indicated by a digital command input signal; and
analog lock means connected to said digital angle encoder to be activated when said digital control means moves the item to a position separated from the desired position by a predetermined distance from the digital command input signal position uitlizing the analog difference signal for operating the servo motor controller to maintain the item within a predetermined position of the desired position.

19. A servo as claimed in claim 18 including:
an analog to digital converter connected to said resolver; and
a visual readout connected to said analog to digital converter.

20. A servo as claimed in claim 18 wherein said analog to digital converter comprises:
a counter wherein each count represents an angular displacement; and
adjusting means connected to said counter for adjusting the angular displacement which each count represents.

* * * * *

UNITED STATES PATENT AND TRADEMARK OFFICE
CERTIFICATE OF CORRECTION

PATENT NO. : 4,021,714
DATED : May 3, 1977
INVENTOR(S) : Donald H. Jones, Robert G. Burig, Paul F. McNally It is certified that error appears in the above-identified patent and that said Letters Patent are hereby corrected as shown below:

Column 1, lines 38-39, "the position of the shaft with prior art servo control" (second occurrence) should be deleted.

Column 3, line 44, "178" should read --1/2--.

Column 5, line 24, "last" should read --least--.

Column 6, line 12, "0.18°" should read --+0.18°--.

Column 7, line 22, "1/4" should read --1/2--.

Column 9, line 49, "$\theta - \phi'$" should read --$\phi - \phi'$--.

Column 16, line 37, "uitlizing" should read --utilizing--.

Signed and Sealed this second Day of August 1977

[SEAL]

Attest:

RUTH C. MASON
Attesting Officer

C. MARSHALL DANN
Commissioner of Patents and Trademarks